US006994434B2

(12) United States Patent
Blanchette et al.

(10) Patent No.: US 6,994,434 B2
(45) Date of Patent: Feb. 7, 2006

(54) EYEWEAR WITH LENS HINGE

(75) Inventors: Luc Blanchette, Montreal (CA); Martin Pernicka, Montreal (CA)

(73) Assignee: Cabot Safety Intermediate Corp., Newark, DE (US)

( * ) Notice: Subject to any disclaimer, the term of this patent is extended or adjusted under 35 U.S.C. 154(b) by 0 days.

(21) Appl. No.: 10/648,703

(22) Filed: Aug. 25, 2003

(65) Prior Publication Data

US 2004/0141146 A1 Jul. 22, 2004

Related U.S. Application Data

(63) Continuation of application No. PCT/US02/05786, filed on Feb. 25, 2002.

(51) Int. Cl.
*G02C 1/02* (2006.01)

(52) U.S. Cl. ....................... 351/110; 351/116; 351/153; 16/228

(58) Field of Classification Search ................ 351/153, 351/116, 111, 110, 41, 120; 16/228
See application file for complete search history.

(56) References Cited

U.S. PATENT DOCUMENTS 5,418,581 A * 5/1995 Conway ..................... 351/116

* cited by examiner

*Primary Examiner*—Hung Xuan Dang
(74) *Attorney, Agent, or Firm*—Cantor Colburn LLP

(57) ABSTRACT

The eyewear described comprises a lens having, at opposite lateral sides thereof, a pair of detachable ear stems which are adapted to move from an inwardly folded position to an outwardly ear contacting position. The lens displays, at each lateral side, an opening and a stem connecting portion that defines a hinge element forming an integral part of the lens. The proximal end portion of the ear stem defines a U-shaped recess which is engageable with the hinge element. The recess is formed by a pair of resilient branches which, together with a constriction at the entry of the recess, enables a snap-in engagement and a snap-out disengagement of the ear stem to and from the lens. No additional component is required for this three-piece eyewear.

5 Claims, 5 Drawing Sheets

EYEWEAR WITH LENS HINGE

CROSS REFERENCE TO RELATED APPLICATIONS

The present application claims priority to International Patent Application No. PCT/US02/05786, filed Feb. 25, 2002, the entire contents of which are specifically incorporated herein by reference, which claims priority to Canadian Patent Application No. 2,337,940, filed Feb. 23, 2001, the entire contents of which are specifically incorporated herein by reference.

BACKGROUND

Typical conventional eyewear comprises any number of a series of components, including one or more lenses, a frame element, and temple pieces, or ear stems. With particular regard to attachment of ear stems to eyewear, it is common to attach one end of such ear stems to the eyewear via a hinge or pin, or by permanently adhering such ear stem to the eyewear or integrally forming such ear stem with the eyewear. However, such attachment configurations may be problematic when dismantlement of the eyewear is desired.

SUMMARY

The present eyewear advantageously provides a simplified eyewear which comprises three components, namely, a lens and a pair of ear stems, the latter being easily detachable from the lens. The present eyewear also advantageously provides an eyewear in which the pair of ear stems are mounted directly to the lens without any additional components.

In one embodiment, the eyewear comprises a unitary lens having its opposite lateral sides receiving a pair of detachable ear stems, which are adapted to move from an inwardly folded position to an outwardly ear contacting position. The lens includes, at each lateral side, an opening and a stem connecting portion which defines a hinge element and forms an integral part of the lens. The proximal end portion of the ear stem defines a U-shaped recess having a constricted entry and being engageable with the hinge element. This proximal end has some resiliency enabling a snap-in engagement and a snap-out disengagement of the ear stem directly onto and from the lens. No additional component is required to this three-piece eyewear.

In one exemplary embodiment, means are provided to limit the outward movement of the ear stem to its ear contacting position.

In another exemplary embodiment, a U-shaped recess is defined by a pair of branches, one of the branches being longer than the other branch and forming part of a limiting means.

In another form of the invention, the hinge element has a generally cylindrical shape, but includes a longitudinal projection on its outer wall to thereby provide a restrictive movement of the ear stem during passage between the folded position to the outwardly extending position, or vice-versa.

Other objects and further scope of applicability of the presently disclosed eyewear will become apparent from the detailed description given hereinafter. It should be understood, however, that this detailed description, while indicating exemplary embodiments of this invention, is given by way of illustration only since various changes and modifications within the spirit and scope of the invention will become apparent to those skilled in the art.

IN THE DRAWINGS

Referring now to the drawings, wherein like elements are numbered alike in the FIGURES.

DESCRIPTION OF EXEMPLARY EMBODIMENTS

Reference will now be made in detail to exemplary embodiments of heat management systems, examples of which are illustrated in the accompanying FIGURES.

Figure 1:
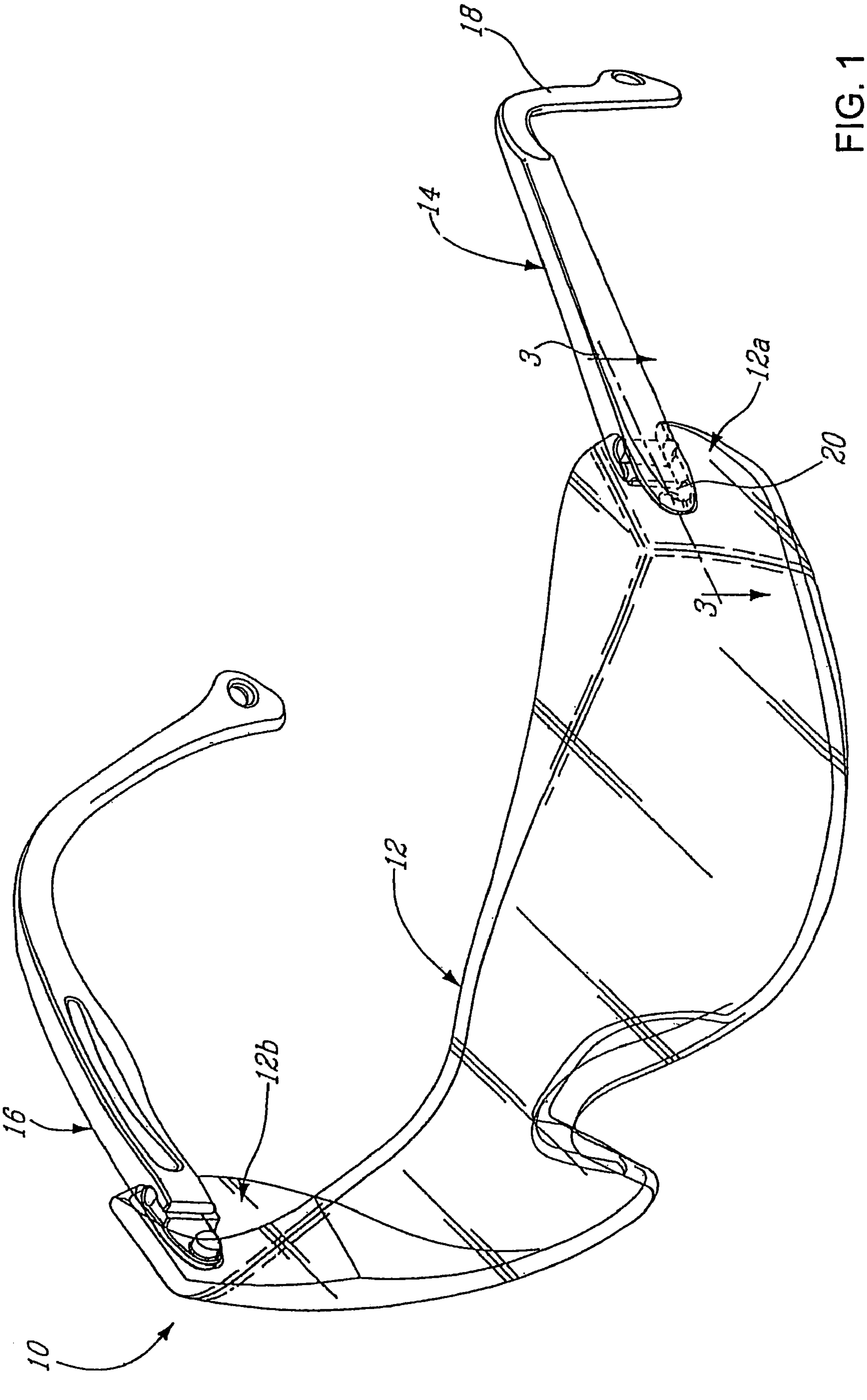
FIG. 1 is a perspective view of an eyewear made in accordance with the present invention.

Referring to FIG. 1, there is shown an eyewear, generally denoted 10, comprising three components, namely, an exemplary lens 12 and a pair of ear stems 14 and 16 which are identical in construction and which are mounted to respective opposite lateral sides 12*a* and 12*b* of the lens. In one exemplary embodiment, such lens 12 is a unitary arcuate lens made of transparent plastic material.

The illustrated ear stems 14 and 16 being identical in shape, a description will be given with respect to one ear stem only.

Figure 2:
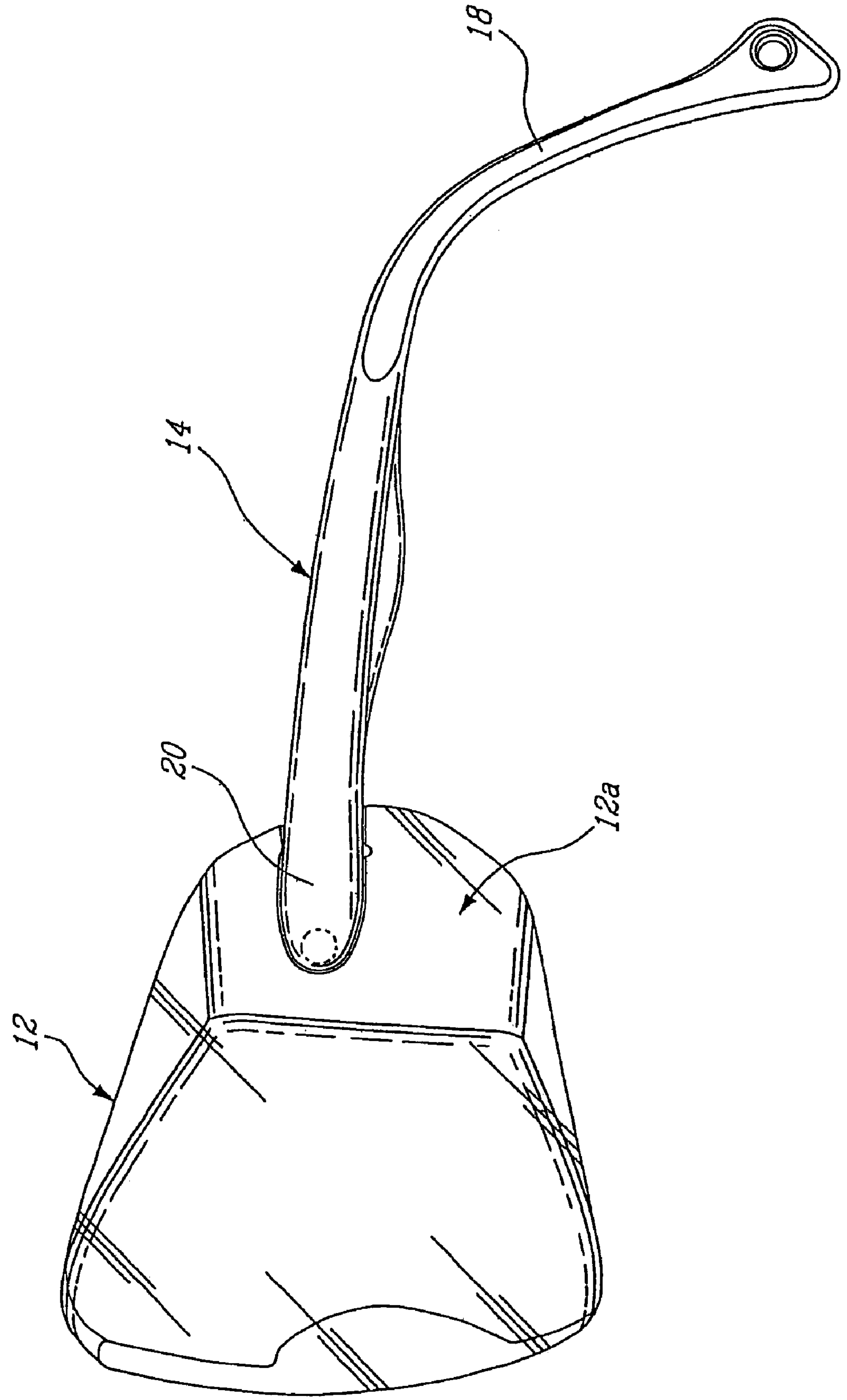
FIG. 2 is a side elevational view of the eyewear.
Figure 3:
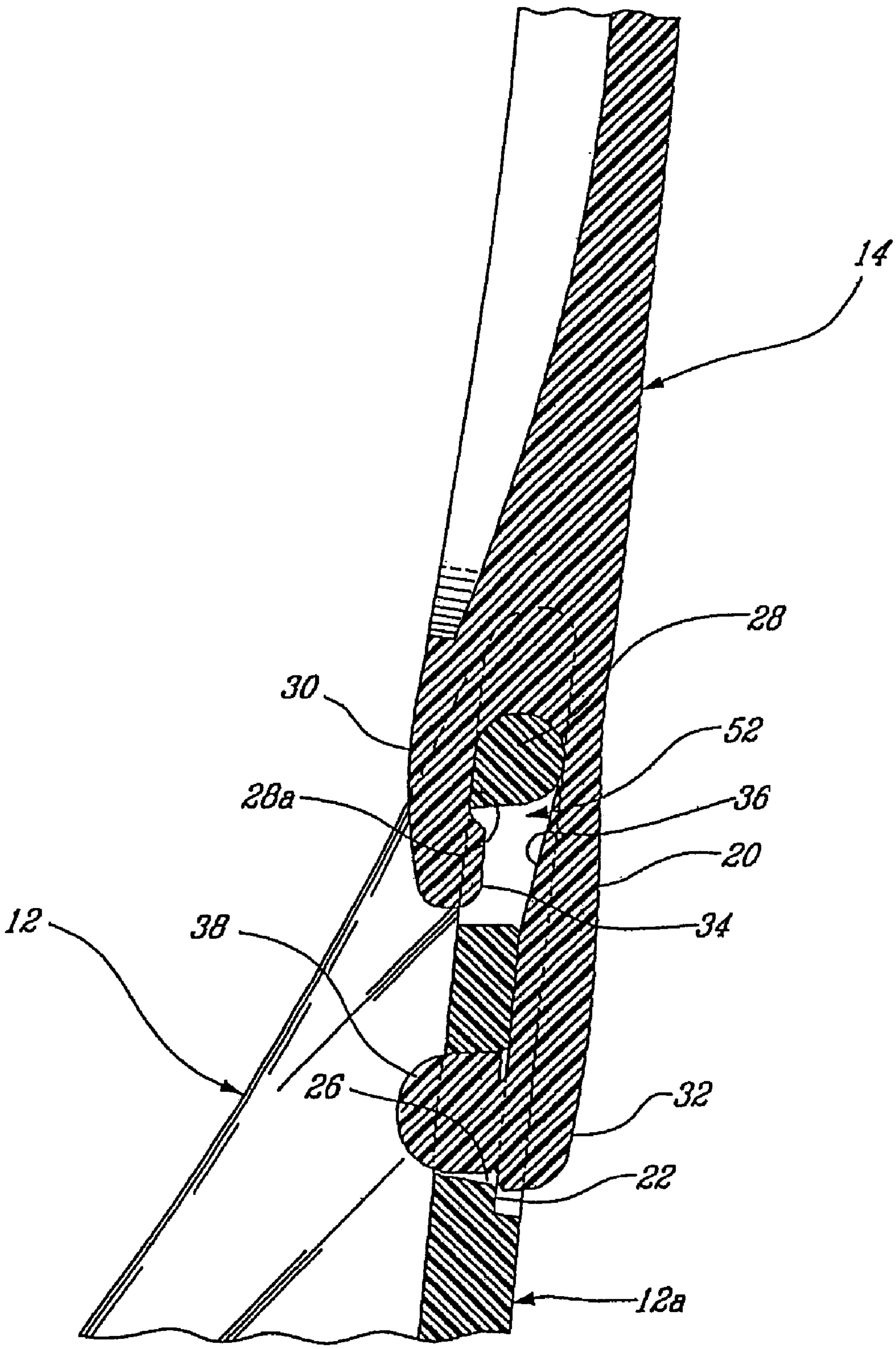
FIG. 3 is a cross-sectional view taken along lines 3—3 of FIG. 1.
Figure 4:
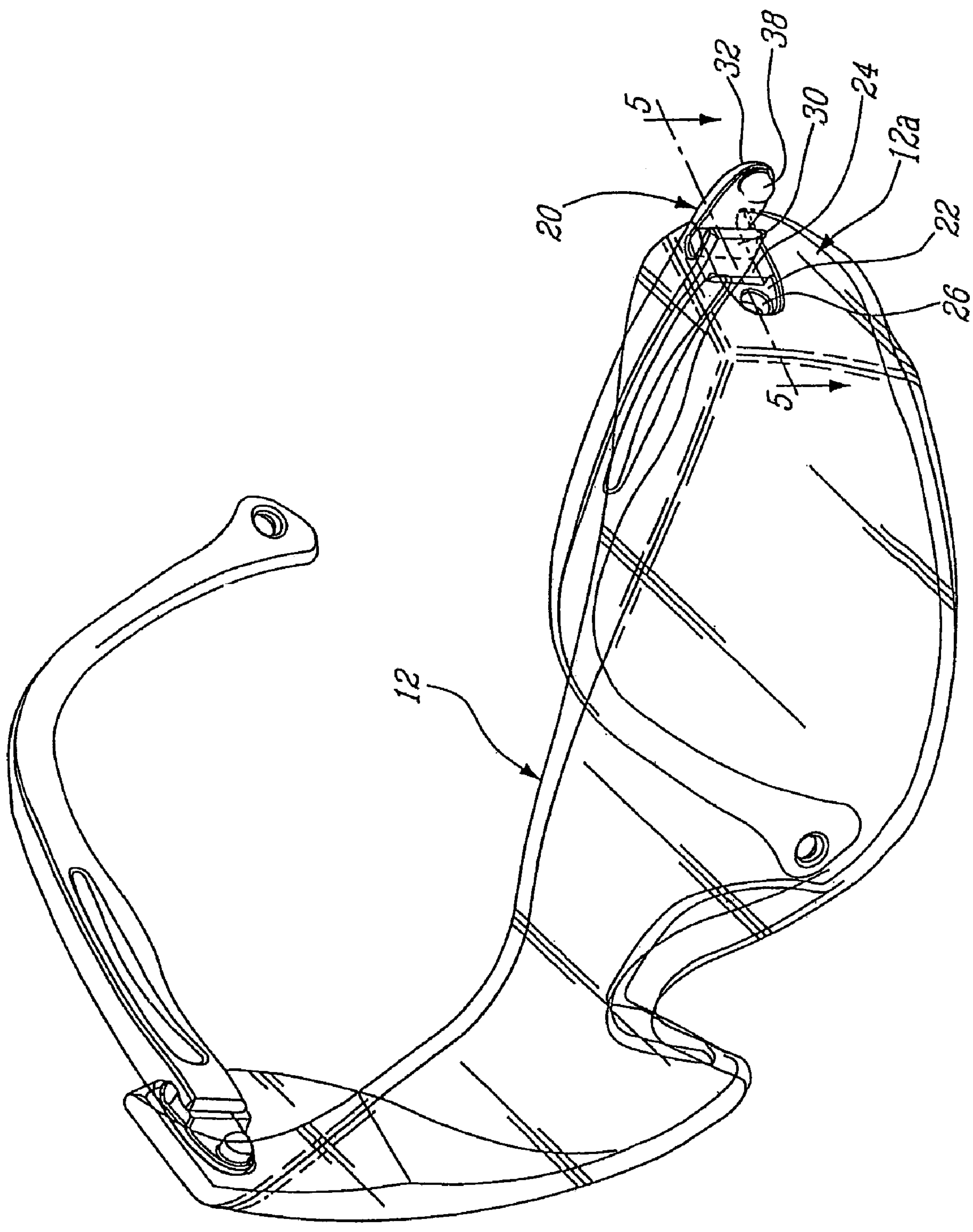
FIG. 4 is a perspective view of the eyewear showing one ear stem in the inwardly folded position.

Referring also to FIGS. 2, 3 and 4, the exemplary ear stem 14 comprises an ear contacting distal end portion 18 and a proximal end lens contacting portion 20. In the illustrated exemplary embodiment, the lateral side portion 12*a* of the lens 12 comprises an oblong-shaped recessed area 22 displaying a rectangular-shaped opening 24 and a circular opening 26.

To one side of the opening 24, remote from the opening 26, is a vertically extending column 28 which, as illustrated in FIG. 3, has a generally cylindrical shape except for a longitudinal projection portion 28*a* on its outer wall. As explained further hereinbelow, the column 28 serves as a hinge element for the ear stem 14 and forms an integral part of the lens.

The proximal end 20 of the ear stem of the illustrated exemplary embodiment defines a U-shaped recess defined by a pair of branches 30 and 32. Branch 30 is shorter than branch 32 and has an enlarged extremity 34 which defines with the opposite inner face 36 of the longer branch 32 a constricted recess entry which is slightly smaller than the overall outer diameter of the cylindrical-shaped hinge element 28. Branch 32 has an oblong shape corresponding to the oblong shape of the recessed area 24 so as to be lodged therein when the ear stems are in the ear contacting position.

The inner face of the longer branch 32 displays a dome-shaped protuberance 38 which is so dimensioned as to be received in the circular opening 26 of the lens when the ear stem is in its ear contacting position.

Figure 5:
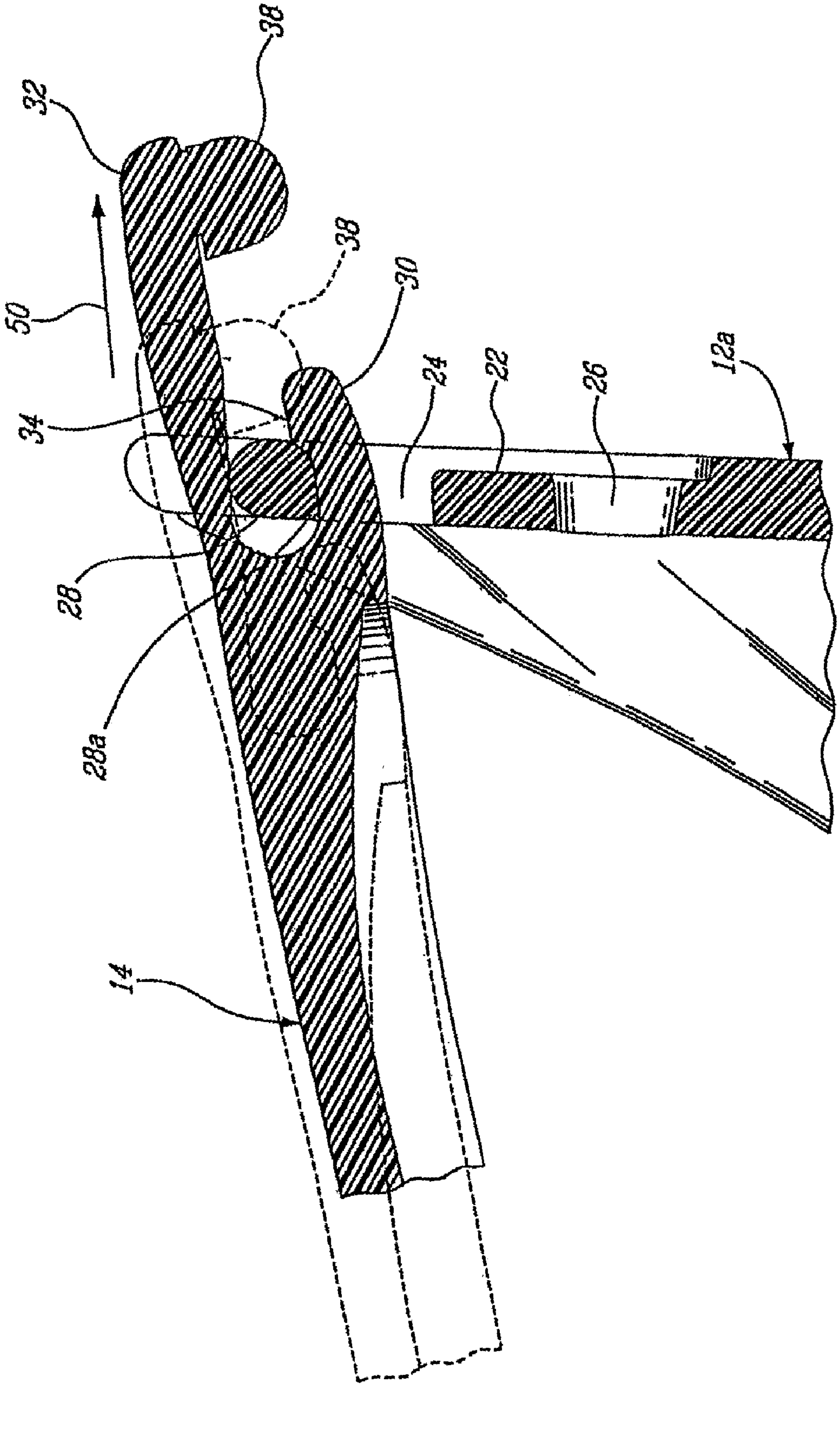
FIG. 5 is a cross-sectional view taken along lines 5—5 of FIG. 4.

Referring to FIG. 5, the mounting of the ear stem to the lens is indicated by arrow 50 whereby the U-shaped recess at the proximal end of the ear stem engages the hinge element 28 of the lens. The material of the ear stem, at least in the proximal end portion thereof, may be resilient, such as plastic material, so that this engagement of the ear stem to the hinge element may be carried out by forcing entry of the branches so that the latter will slightly open to allow lodging of the hinge element in the receptive area 52 between the branches. This facilitates a snap-in engagement of the ear stem to the lens or, in a direction opposite to arrow 50, a snap-out disengagement of the ear stem from the lens.

The ear stem may be limited, in its outward movement, by branch portion 32 contacting the recessed lens area 24. This entry of protuberance 38 in the circular opening 25 also assists in securing the ear stem in its outward position. To maintain the ear stem in either the inwardly folded position of FIG. 4, or the ear contacting position shown in FIG. 1, the presence of the projection 28*a* on the outer wall of the hinge element 28 may be included to prevent free pivotal movement of the ear stem due to the larger surface area of the hinge element with the inner face of the shorter branch such as illustrated in FIGS. 3 and 5.

As can be seen in FIG. 5, the branch 30 has its end portion extending through the opening 24 when the ear stem is in its inwardly folded position.

While the invention has been described with reference to an exemplary embodiment, it will be understood by those skilled in the art that various changes may be made and equivalents may be substituted for elements thereof without departing from the spirit or scope of the invention. In addition, many modifications may be made to adapt a particular situation or material to the teachings of the invention without departing from the essential scope thereof. Therefore, it is intended that the invention not be limited to the particular embodiment disclosed as a best mode contemplated for carrying out the invention, but that the invention will include all embodiments falling within the scope of the appended claims.

What is claimed is:

1. Eyewear comprising:

a leans; and at least one detachable ear stem mounted at a side of said lens and being adapted to move from an inwardly folded position to an outwardly ear contacting position, said lens displaying an opening and a stem connecting portion located adjacent said opening and defining a hinge element forming an integral part of said lens, said ear stem having an ear contacting distal end portion and a lens engaging proximal end portion, said proximal end portion defining a U-shaped recess engageable with said hinge element, said recess displaying a constricted entry and being formed of a resilient material to hereby enable a snap-in engagement and a snap-out disengagement, said hinge element and said opening allowing said proximal end of said ear stem to move from said folded position to and from said outwardly ear contacting portion, further comprising means for limiting outward movement of said ear stem to said ear contacting position, wherein said U-shaped recess is defined by a pair of branches, one of said branches being longer than the other, said limiting means consisting of said longer branch contacting said lens, wherein said longer branch comprises a protuberance on an inner face thereof; said lens including, adjacent said opening remote from said hinge element, a second opening to receive said protuberance on said longer branch therein.

2. Eyewear as defined in claim 1, wherein said hinge element has a generally cylindrical shape including a longitudinal projection on its outer wall to thereby provide restrictive movement of said ear stem during movement between said folded position and said outwardly extending position.

3. Eyewear as defined in claim 1, wherein a portion of said shorter branch extends in said opening when said ear stem is in said inwardly folded position.

4. Eyewear as defined by claim 1, wherein the lens is an arcuate lens.

5. Eyewear as defined by claim 1, wherein the lens is a unitary lens.

* * * * *